Patented May 13, 1941

2,241,963

UNITED STATES PATENT OFFICE 2,241,963

COMPOSITION FOR PREVENTING OR STOPPING LEAKS IN CONDUITS

Helman Rosenthal, Dallas, Tex., assignor to Robert B. Giles, Dallas, Tex.

No Drawing. Application January 19, 1938, Serial No. 185,786

2 Claims. (Cl. 134—17.5)

This invention relates to a composition for preventing or stopping leaks in the radiators of automobiles, pipes, boilers and other liquid holding conduits or vessels.

The general object of the invention is to provide a composition of the class described adapted to be charged into the liquid of a water circulation system, for example, and to circulate through said system, retaining indefinitely its optimum efficiency as a leak stopper and at the same time conditioning the walls of the conduit through which it flows so as to remove or prevent impediments to flow, and to avoid the formation of corrosive products the presence of which might impair the efficiency of the anti-leak composition.

The composition of the present invention is an improvement of the anti-leak composition described in the reissued Patent 15,971 to Will N. Shrum originally granted on July 5, 1921, which composition functions by providing fibrous particles in liquid suspension, associated with starchy material and binding materials such as resin and gum which upon exposure to air hold the fibrous material together in a mass as it catches on the edge of the wall of the conduit surrounding the leak aperture.

The Shrum anti-leak compound comprises the following ingredients in substantially the stated proportions:

| | | |
|---|---|---|
| Comminuted asbestos | pound | 1 |
| Finely ground paper | do | 1½ |
| Starchy paste | gallons | 2 |
| Gum arabic | ounce | ½ |
| Resin | do | ½ |
| Safrol | do | ½ |
| Salicylic acid | do | ½ |
| Alcohol | pint | ⅛ |

In the above formula the safrol is a deodorant, the salicylic acid a preservative and the alcohol a solvent for the resin, and these ingredients may be substituted by other ingredients having equivalent functions.

The essentials of this formula insofar as it forms the basis of the present improvement are the asbestos, the paper and starch and some resinous binding material. Obviously the solvent for resin should be of such nature as to permit the resin to quickly solidify upon exposure to air.

One of the drawbacks to the use of the above composition is that the fibrous material, i. e., the asbestos and paper, which should remain fully in suspension until called upon to perform their leak-stopping functions, settle during the period when the water is not in motion or circulating, forming masses which do not readily disintegrate and which not only represent so much of the material withdrawn from circulation, but may also cause stoppages of ducts of small bore such as the radiator tubes or passages.

The tendency of the original composition to flocculate and/or settle is initiated by the mineral constituents present in water. All natural waters have a certain amount of mineral constituents in solution, which may vary from a few parts to several thousand parts per million. This flocculating effect may be due to the alteration of the sign or intensity of the charge present on the colloidal matter, as well as to the precipitating effect of the various ions in the water.

The old composition permitted continuous corrosion (iron rust) and liberation of particles which action is detrimental to the efficacy of the mixture due to the fact that these particles tend to cling to the fibrous material, and which being heavier than the fibrous material, tend to bear them down.

Another drawback to the efficiency of the original Shrum composition is that the wall of the tubes of the radiator and other passages in the circulating system are usually affected by rough projections in the form of scale and rust upon which the fibers catch mechanically, forming clods or masses upon the walls of the tubes, reducing their cross section, throttling the flow therethrough and perhaps causing stoppages. The anti-leak liquid is also impoverished of its fibrous content to the extent that these fibers are retained on the conduit walls.

The present invention seeks to avoid both of these disadvantages. It incorporates with the ingredients of the Shrum composition a compound selected from the following group: tannic acid, seaweed, dextrine, glucose, tannin and gallic acid. These substances perform two functions, first by lowering the surface tension of the liquid they increase the dispersion of the fibrous particles preventing them from flocculating, thereby retarding their tendency to settle out of the liquid. Secondly, they loosen and remove scale and corrosion products, and also prevent the formation of scale on the walls of the tubes. Thus the walls are made smooth and no place is provided upon or against which the fibrous particles may lodge and be retained, also a clean surface is provided for the corrosion inhibitor. Thus the tannic acid and its equivalents may be regarded in the nature of a protective colloid, to the anti-leak liquid.

Another feature of the improvement provided by the present invention is the incorporation into the Shrum composition of a substance selected from the following compounds: potassium dichromate, potassium chromate, sodium dichromate, sodium chromate or chromic acid. These substances are characterized by their capacity to form a tenacious film upon the metallic surfaces of the conduits which is inert to the action of the anti-leak composition, also to corrosive substances which may be in the circulating liquid. Consequently, once the interior surfaces of the conduits have been rendered clean of scale and free from corrosion by the tannic acid or any other functional equivalent grouped therewith, said conduits are kept permanently smooth and clean by the action of the potassium dichromate or the compounds grouped therewith.

One of the most important functions performed by the last named group of substances is that particles of rust and other corrosive products do not become mixed with the anti-leak liquid and the permanence of suspension of the fibrous particles is not disturbed and there are no particles of corrosive matter to be washed into the liquid to form nuclei upon which the fibrous particles in suspension would collect and which would cause the precipitation of said fibrous particles.

The improved composition of the present invention may be prepared by taking one pound of comminuted asbestos, one and one-half pounds of dry paper, two gallons of wheat or rice paste, one-half ounce of gum arabic, one-half ounce of English resin; the last named ingredient being dissolved in one-eighth pint of alcohol, one-half ounce of safrol or any similar deodorizing agency, and one-fourth ounce of salicylic acid, the latter being a preservative. These ingredients are mixed together and with sufficient water to make ten gallons. To the above is added an amount of tannin or equivalent substance which may vary from as little as forty-five hundredths of an ounce to four and one-half ounces. It will be obvious that since the amount to be added depends upon the conditions as regards the presence of scale and corrosion products in the conduits, the amount is not critical but in preparing a commercial composition the optimum amount for average conditions will be added.

The quantity of potassium dichromate or other corrosion-inhibiting compound to be incorporated into the mixture is also non-critical. Actual experience has shown that in certain cases as little as thirteen hundredths of an ounce in ten gallons of mixture will produce good results. For average conditions, however six and one-half ounces are preferable. Greater amounts may be used if desired, as an excess amount of the compound is harmful neither to the mixture nor to the conduit. The tannic acid or its equivalents and the potassium dichromate or its equivalents may be added either before or after the final solution is made up to ten gallons.

In using the improved anti-leak and conduit conditioning composition in an automobile water circulating system for example, whether for stopping leaks now present or for safeguarding the system against prospective leaks, about one quart of the liquid mixture is added to the four or five gallons of water which constitutes the average quantity of liquid in the cooling system. The automobile may be operated with no further thought to the cooling system. If a leak is present the fibrous material will collect at the aperture and quickly harden into a mass by exposure to air by virtue of the air-setting binding ingredients. If the leak does not exist at the time the liquid mixture is added to the circulating water, said mixture will retain its full strength and leak-stopping properties indefinitely through the action of the tannic acid or its equivalent which denudes the interior of the conduits of scale and adherent corrosive products, and also through the agency of the potassium dichromate or its equivalent which keeps new corrosive material and rust from forming or depositing on the walls of said conduits. In view of the fact that scale and corrosive products are removed from the metallic surfaces and must therefore to some extent mix with the circulating water, it may be preferable after operating the automobile for a few days or weeks, depending upon conditions, to drain out the first charge of the improved anti-leak and conduit conditioning composition, so as to get rid of the contaminated water and then to add a fresh charge.

While I have in the above disclosure described what I believe to be a preferred and practical embodiment of the invention, it will be understood to those skilled in the art that the proportions of the ingredients may be varied, or the ingredients themselves may be substituted by equivalents, or the technique of its manufacture and application may be varied without transcending the spirit or scope of the invention as defined in the appended claims.

What I claim as my invention is:

1. A composition for stopping leaks in engine radiators comprising finely divided fibrous material, resinous material, tannic material to aid suspension of said fibrous material and material to afford chromate ion.

2. A composition for stopping leaks in engine radiators comprising finely divided vegetable fibrous material, resinous material, tannin to aid suspension of the vegetable fibres and material to afford chromate ion.

HELMAN ROSENTHAL.